US008743835B2

(12) United States Patent
Kim et al.

(10) Patent No.: US 8,743,835 B2
(45) Date of Patent: Jun. 3, 2014

(54) COMMUNICATION SYSTEM OF SELECTIVELY FEEDING BACK INFORMATION ABOUT INTERFERENCE CHANNELS FOR INTERFERENCE ALIGNMENT AND METHOD FOR OPERATING THE SYSTEM

(75) Inventors: Young-Doo Kim, Seoul (KR); Chan Soo Hwang, Yongin-si (KR); Eung Sun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 908 days.

(21) Appl. No.: 12/567,779

(22) Filed: Sep. 27, 2009

(65) Prior Publication Data

US 2010/0227613 A1 Sep. 9, 2010

(30) Foreign Application Priority Data

Mar. 3, 2009 (KR) .................. 10-2009-0017956

(51) Int. Cl.
*H04W 4/00* (2009.01)
(52) U.S. Cl.
USPC .......................... 370/332; 370/260; 370/310
(58) Field of Classification Search
USPC ........................................................ 370/332
See application file for complete search history.

(56) References Cited

U.S. PATENT DOCUMENTS

| | | | | |
|---|---|---|---|---|
| 8,140,070 | B2 * | 3/2012 | Ashikhmin et al. | 455/424 |
| 2007/0064632 | A1 | 3/2007 | Zheng et al. | |
| 2007/0064829 | A1 | 3/2007 | Zheng et al. | |
| 2007/0298718 | A1 | 12/2007 | Je et al. | |
| 2008/0080631 | A1 | 4/2008 | Forenza et al. | |
| 2008/0161009 | A1 * | 7/2008 | Zhao et al. | 455/452.2 |
| 2008/0165875 | A1 | 7/2008 | Mundarath et al. | |
| 2008/0219194 | A1 * | 9/2008 | Kim et al. | 370/310 |
| 2008/0225964 | A1 * | 9/2008 | Han et al. | 375/260 |
| 2009/0092059 | A1 * | 4/2009 | Fu | 370/252 |
| 2009/0312047 | A1 * | 12/2009 | Satou et al. | 455/522 |
| 2012/0044830 | A1 * | 2/2012 | Kim et al. | 370/252 |

FOREIGN PATENT DOCUMENTS

| | | |
|---|---|---|
| KR | 1020070122044 | 12/2007 |
| KR | 1020080081698 | 9/2008 |
| KR | 1020080086726 | 9/2008 |

OTHER PUBLICATIONS

Viveck R. Cadambe et al., "Interference Alignment and Spatial Degrees of Freedom for the K User Interference Channel," Electrical Engineering and Computer Science University of California Irvine, 2007, 30 pages.

* cited by examiner

*Primary Examiner* — Ajibola Akinyemi
(74) *Attorney, Agent, or Firm* — NSIP Law

(57) ABSTRACT

A communication system may include a serving base station and neighboring base stations. Each of the serving base station and the neighboring base stations may have a corresponding user group. Terminals belonging to a particular user group may feed back information associated with interference channels, and reasonably generate a precoding matrix. Through this, it is possible to perform an accurate interference alignment and to enhance a throughput. In this instance, terminals belonging to the other user groups may feed back information associated with a throughput, and a corresponding base station may perform the interference alignment using a user selection resulting in decreased overhead.

27 Claims, 8 Drawing Sheets

COMMUNICATION SYSTEM OF SELECTIVELY FEEDING BACK INFORMATION ABOUT INTERFERENCE CHANNELS FOR INTERFERENCE ALIGNMENT AND METHOD FOR OPERATING THE SYSTEM

CROSS-REFERENCE TO RELATED APPLICATION

This application claims the benefit under 35 U.S.C. §119(a) of a Korean Patent Application No. 10-2009-0017956, filed on Mar. 3, 2009, in the Korean Intellectual Property Office, the entire disclosure of which is incorporated herein by reference.

BACKGROUND

1. Field

The following description relates to a communication system that may perform an interference alignment and a technology that may be applicable to entities belonging to the communication system.

2. Description of the Related Art

Currently, research regarding a communication system including a plurality of base stations is being actively conducted in order to enhance the data transmission rate and communication reliability of the communication system. The plurality of base stations may include a cellular base station, a femto base station, a fixed base station, a mobile base station, and the like, and may denote a transmitter to transmit data.

The plurality of base stations may communicate with a user group that includes a corresponding user or a plurality of users using the same radio resource, for example, a frequency, a time, a code resource, and the like. Interference may occur in the user or user group when the plurality of base stations uses the same radio resource. Overall throughput of the system may decrease due to the interference. For example, where it is assumed that base stations 1, 2, and 3 correspond to user groups 1, 2, and 3, respectively, the base stations 1 and 3 may produce interference in the user group 2.

Accordingly, attention currently is being given to interference control technology, interference alignment technology, and the like that may enhance efficiency of the use of radio resources and that also may mitigate the decrease in throughput caused by the interference. Since the interference control technology or the interference alignment technology may add to the overhead in a communication system, various types of research is ongoing with regard to optimizing interference control technology and interference alignment technology.

SUMMARY

In one general aspect, a base station that is any one of at least two neighboring base stations adjacent to a serving base station may include an interference recognition unit to recognize information, associated with interference channels between the at least two neighboring base stations and a target terminal, that is fed back by the target terminal, among a plurality of terminals belonging to a user group corresponding to the serving base station, and a precoding matrix generation unit to generate a target precoding matrix based on information associated with the interference channels and information associated with a precoding matrix used by another of the at least two neighboring base stations.

The at least two neighboring base stations may having corresponding neighboring user groups. A plurality of terminals belonging to the neighboring user groups may generate decoding matrices based on corresponding interference channels, and feed back, to at least one neighboring base station of the at least two neighboring base stations, information associated with a throughput that is calculated based on the decoding matrices. Each of the at least two neighboring base stations may select at least one terminal from the plurality of terminals belonging to the neighboring user groups, based on the fed back information associated with the throughput.

Specifically, in a communication system, a portion of user groups may feed back information associated with interference channels, whereas another portion of the user groups may feed back information associated with a throughput. Accordingly, an interference alignment using a user selection may be performed.

In another general aspect, a target terminal that belongs to a user group corresponding to a serving base station, may include a feedback unit to feed back information associated with interference channels between at least two neighboring base stations adjacent to the serving base station and the target terminal, and an interference cancellation unit to cancel aligned interference that is received from the at least two neighboring base stations. Any one neighboring base station of the at least two neighboring base stations may use, for an interference alignment, a target precoding matrix that is generated based on information associated with the interference channels. The serving base station and another of the at least two neighboring base stations may use random precoding matrices.

The at least two neighboring base stations may have corresponding neighboring user groups. A plurality of terminals belonging to the neighboring user groups may generate decoding matrices based on corresponding interference channels, and feed back, to the at least two neighboring base stations, information associated with a throughput that is calculated based on the decoding matrices. Each of the at least two neighboring base stations may select at least one terminal from the plurality of terminals belonging to the neighboring user groups, based on the fed back information associated with the throughput.

In still another general aspect, a method of operating any one terminal among a plurality of terminals belonging to a neighboring user group corresponding to any one neighboring base station of at least two neighboring base stations adjacent to a serving base station, may include estimating interference channels between the serving base station and another neighboring base station and the one terminal, generating a decoding matrix for extracting a desired signal that is transmitted from the one neighboring base station, based on the estimated interference channels, and feeding back, to the one neighboring base station, information associated with a throughput of the desired signal that is calculated based on the generated decoding matrix. Terminals belonging to a user group corresponding to the serving base station may feed back, to another of the at least two neighboring base stations, information associated with corresponding interference channels. The another of the at least two neighboring base stations may generate and use a precoding matrix for an interference alignment of at least one terminal of the terminals belonging to the user group, based on information associated with the corresponding interference channels.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, methods, and/or media described herein will be suggested to those of ordinary skill in the art. Also, the description of well-known functions and constructions may be omitted to increase clarity and conciseness.

Figure 1:
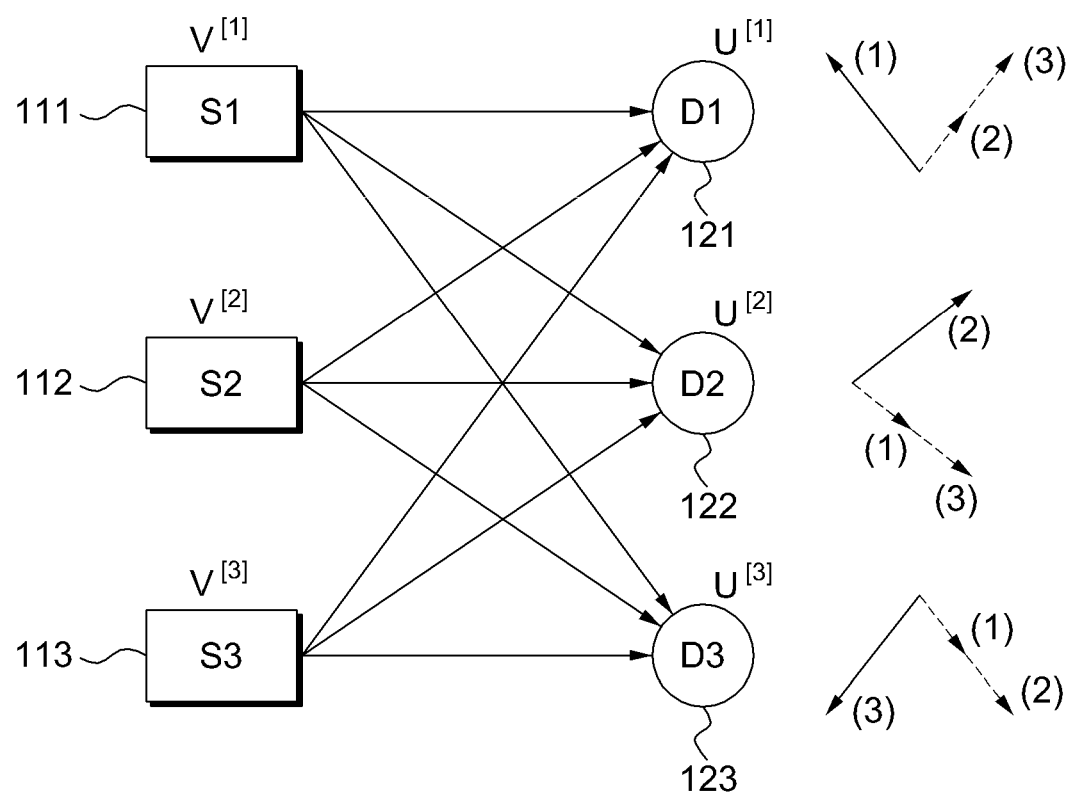
FIG. 1 is a diagram illustrating an example of a communication system using an interference alignment technology that is a type of an interference control scheme.

FIG. 1 illustrates a communication system using an interference alignment technology employing an interference control scheme. Referring to FIG. 1, the communication system or a communication network may include source nodes (S1, S2, and S3) 111, 112, and 113. Each of the source nodes (S1, S2, and S3) 111, 112, and 113 may correspond to each of destination nodes (D1, D2, and D3) 121, 122, and 123, respectively.

Each of the source nodes (S1, S2, and S3) 111, 112, and 113 denotes a data transmission device that includes a fixed base station, a mobile base station, a miniature base station such as a femto base station, a relay station, and the like. Each of the destination nodes (D1, D2, and D3) 121, 122, and 123 denotes a data reception device that includes a relay station, a fixed terminal, a mobile terminal, and the like.

When each of the source nodes (S1, S2, and S3) 111, 112, and 113 transmits data using the same radio resource, interference may occur in each of the destination nodes (D1, D2, and D3) 121, 122, and 123. For example, in the destination node (D1) 121, a signal of the source node (S1) 111 corresponds to a desired signal and signals of the source nodes (S2, S3) 112 and 113 correspond to interference. Similarly, interference may occur even in the destination nodes (D2, D3) 122 and 123. The above described interference may decrease a throughput of the communication system.

The decrease in the throughput caused by the interference may be prevented using an interference control scheme or an interference alignment technology described herein. Specifically, the source nodes (S1, S2, and S3) 111, 112, and 113 may adjust a phase of a signal using reasonably designed precoding matrices $V^{[1]}$, $V^{[2]}$, and $V^{[3]}$, respectively. A signal of each of the source nodes (S1, S2, and S3) 111, 112, and 113 with the adjusted phase may be transmitted via channels. A received signal of each of the destination nodes (D1, D2, and D3) 121, 122, and 123 may be separated into a desired signal and unwanted interference.

More specifically, assume that the arrow indicators (1), (2), and (3) of FIG. 1 denote a desired signal of the destination nodes (D1, D2, and D3) 121, 122, and 123, respectively. A received signal of the destination node (D1) 121 may be separated into a desired signal (1) of the destination node (D1) 121, and interference (2) and (3). A received signal of the destination node (D2) 122 may be separated into a desired signal (2) of the destination node (D2) 122, and interference (1) and (3). A received signal of the destination node (D3) 123 may be separated into a desired signal (3) of the destination node (D3) 123, and interference (1) and (2).

The destination nodes (D1, D2, and D3) 121, 122, and 123 may cancel the interference in the received signal to extract the desired signal using reasonably designed decoding matrices $U^{[1]}$, $U^{[2]}$, and $U^{[3]}$, respectively. Specifically, the source nodes (S1, S2, and S3) 111, 112, and 113 may use the reasonably designed precoding matrices $V^{[1]}$, $V^{[2]}$, and $V^{[3]}$, respectively. The destination nodes (D1, D2, and D3) 121, 122, and 123 may use the reasonably designed decoding matrices $U^{[1]}$, $U^{[2]}$, and $U^{[3]}$, respectively. Through use of these precoding matrices, it is possible to enhance the efficiency of the use of radio resources and to prevent a decrease in a throughput of the communication system caused by interference.

Although an expression of the precoding matrices $V^{[1]}$, $V^{[2]}$, and $V^{[3]}$ and the decoding matrices $U^{[1]}$, $U^{[2]}$, and $U^{[3]}$ is used here for ease of description, the precoding matrices $V^{[1]}$, $V^{[2]}$, and $V^{[3]}$ and the decoding matrices $U^{[1]}$, $U^{[2]}$, and $U^{[3]}$ may be in a matrix or a vector form. For example, the precoding matrices $V^{[1]}$, $V^{[2]}$, and $V^{[3]}$ and the decoding matrices $U^{[1]}$, $U^{[2]}$, and $U^{[3]}$ may have the form of a matrix or a vector according to a number of data streams of each of the source nodes (S1, S2, and S3) 111, 112, and 113.

When the communication system employs an interference control scheme or an interference alignment technology, overhead of the system may be greatly increased. However, in the examples provided herein, a concept of overhead may be divided into overhead that may occur while terminals feed back interference channel information, overhead that may occur while sharing the interference channel information, and overhead that may occur while iteratively generating precoding matrices or decoding matrices.

For example, in a frequency division duplex (FDD) environment, each of the source nodes (S1, S2, and S3) 111, 112, and 113 may need to share information associated with a channel for a desired signal and interference channels. Specifically, in order to perform the interference alignment scheme, the source node (S3) 113 may need to verify information associated with channels of the source node (S2) 112 and channels of the source node (S1) 111 as well as information associated with channels of the source node (S3) 113 to generate the precoding matrix $V^{[3]}$. As a result, overhead may occur due to the above channel information sharing process.

As another example, in a time division duplex (TDD) environment, the source nodes (S1, S2, and S3) 111, 112, and 113, and the destination nodes (D1, D2, and D3) 121, 122, and 123 may generate the precoding matrices $V^{[1]}$, $V^{[2]}$, and $V^{[3]}$, and the decoding matrices $U^{[1]}$, $U^{[2]}$, and $U^{[3]}$, respectively, using an iterative scheme. Use of the iterative scheme also may increase overhead in the communication system.

When the interference alignment scheme is ideally used, a throughput may be enhanced but overhead may be increased in the communication system. Specifically, the throughput and the overhead may have a tradeoff relationship.

In an actual network, the throughput required by each of the destination nodes (D1, D2, and D3) 121, 122, and 123 may be different. In one example, a portion of the user groups may perform a more accurate interference alignment by feeding back information associated with interference channels in order to implement an accurate interference alignment technology. In order to decrease overhead, another portion of the user groups may perform a reasonable level of interference alignment by feeding back information associated with a throughput for a corresponding base station to select an appropriate user. As a result, according to this example, an optimal solution may be provided with respect to the tradeoff relationship between throughput and overhead.

Figure 2:
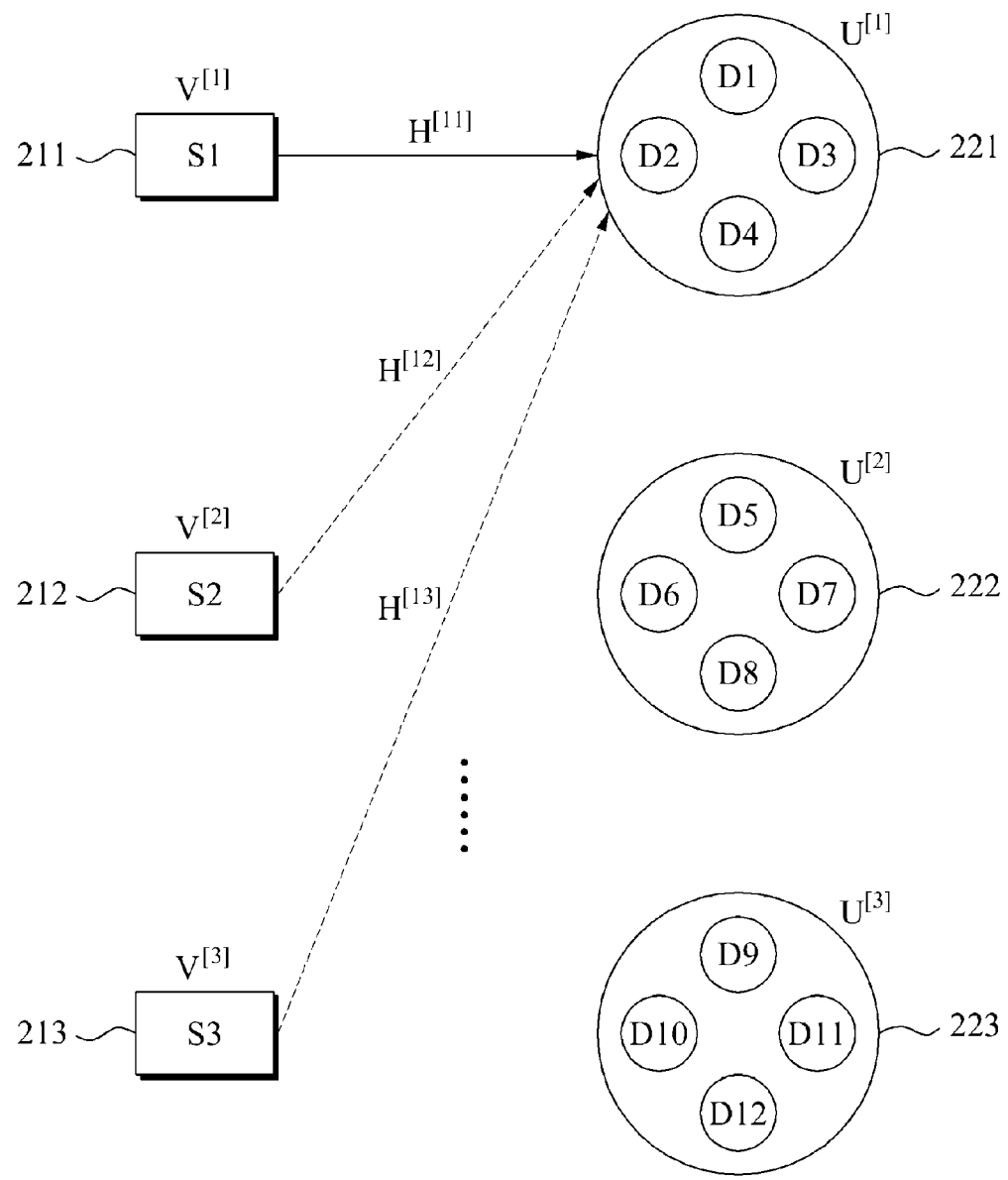
FIG. 2 is a diagram illustrating an example of a communication system to use a random beamforming technology.

FIG. 2 illustrates an example of a communication system to use a random beamforming technology. Referring to FIG. 2, assume that the communication system includes three source nodes (S1, S2, and S3) 211, 212, and 213, and three user groups 221, 222, and 223. The three user groups 221, 222, and 223 correspond to the three source nodes 211, 212, and 213, respectively. Each of the user groups 221, 222, and 223 may include four destination nodes, for example, D1, D2, D3, and D4, D5, D6, D7, and D8, and D9, D10, D11, and D12.

Random Beamforming Technology

When the source nodes (S1, S2, and S3) 211, 212, and 213 transmit data using the same radio resource, and each of the user groups 221, 222, and 223 includes a plurality of destination nodes, each of the destination nodes belonging to the same user group may have a different signal-to-interference plus noise ratio (SINR) or throughput.

For example, among the destination nodes D1, D2, D3, and D4 belonging to the user group 221, the destination node D1 may have a highest SINR or throughput and the destination node D3 may have a lowest SINR or throughput.

In this case, the source nodes (S1, S2, and S3) 211, 212, and 213 do not share information associated with all the channels, and do not retrieve precoding matrices or decoding matrices through an iterative scheme in order to use an interference control scheme or an interference alignment technology, therefore it is possible to enhance a sum rate of the communication system by constructing the destination node D1 and the source node (S1) 211 as a transmit-receive pair. Specifically, since nodes that communicate with the source nodes (S1, S2, and S3) 211, 212, and 213 may be reasonably selected from the user groups 221, 222, and 223, it is possible to enhance the sum rate of the communication system while barely increasing or minimizing overhead. In particular, as a number of destination nodes included in the user groups 221, 222, and 223 increases, further increase the sum rate of the communication system may be likely using this technique.

1. Step 1 of Random Beamforming

Each of the source nodes (S1, S2, and S3) 211, 212, and 213 may randomly determine a corresponding precoding matrix, which may indicate that the source nodes (S1, S2, and S3) 211, 212, and 213 have no need to share information associated with the corresponding precoding matrix. Specifically, according to one example, since each of the source nodes (S1, S2, and S3) 211, 212, and 213 does not require information associated with precoding matrices of other source nodes, overhead may be decreased.

A corresponding precoding matrix $V^{[k]}$ may be determined to satisfy the following Equation 1 expressed as:

$$V^{[k]^H} V^{[k]} = I_{d^{[k]}} \quad (1).$$

Here, k denotes an index of the source nodes (S1, S2, and S3) 211, 212, and 213 corresponding to the transmit nodes, and $d^{[k]}$ denotes a number of data streams or a rank of a $k^{th}$ transmit node. Hereinafter, it is assumed that an index of destination nodes is j.

2. Step 2 of Random Beamforming

All the destination nodes D1, D2, D3, D4, D5, D6, D7, D8, D9, D10, D11, and D12 belonging to the user groups 221, 222, and 223 may estimate interference. For example, interference of the destination node D2 belonging to the user group 221 may be $H^{[1,2]}V^{[2]}$ and $H^{[1,3]}V^{[3]}$.

3. Step 3 of Random Beamforming

Each of all the destination nodes D1, D2, D3, D4, D5, D6, D7, D8, D9, D10, D11, and D12 belonging to the user groups 221, 222, and 223 may generate a decoding matrix U based on the estimated interference according to a predetermined decoding scheme. The decoding matrix U may be generated according to the following Equation 2 expressed as:

$$U^{[j]^H} U^{[j]} = I_{d^{[j]}} \quad (2).$$

Where the index j has a value from 1 to 4, $\bar{d}^{[j]}$ has the same value as $d^{[1]}$, where the index j has a value from 5 to 8, $\bar{d}^{[j]}$ has the same value as $d^{[2]}$, and where the index j has a value from 9 to 12, $\bar{d}^{[j]}$ has the same value as $d^{[3]}$.

The destination nodes D1, D2, D3, D4, D5, D6, D7, D8, D9, D10, D11, and D12 belonging to the user groups 221, 222, and 223 may employ various types of decoding schemes. Specifically, each of the decoding schemes may have a unique criterion. The destination nodes D1, D2, D3, D4, D5, D6, D7, D8, D9, D10, D11, and D12 may generate decoding matrices according to the different criteria. For example, the destination nodes D1, D2, D3, D4, D5, D6, D7, D8, D9, D10, D11, and D12 may use a zero-forcing decoding scheme or a maximum SINR (Max SINR) decoding scheme.

More specifically, for example, where the destination node D2 uses the zero-forcing decoding scheme, a covariance matrix Q with respect to interference in the destination node D2 may be expressed by the following Equation 3:

$$Q = \sum_{j=2}^{3} \frac{P^{[j]}}{d^{[j]}} H^{[1,j]} V^{[1,j]} V^{[1,j]^H} H^{[1,j]^H}. \quad (3)$$

Where $d^{[j]}$ is 1, the destination node D2 may generate a unique vector corresponding to a smallest unique value of the covariance matrix Q as a decoding matrix or vector. Since the Max SINR decoding scheme is a known decoding scheme, further detailed description related thereto is omitted here.

Each of the destination nodes D1, D2, D3, D4, D5, D6, D7, D8, D9, D10, D11, and D12 belonging to the user groups 221, 222, and 223 may generate a decoding matrix and then generate information associated with the quality of a desired signal. In this instance, information associated with the quality of the desired signal may include SINR information or throughput information. Specifically, each of the destination nodes D1, D2, D3, D4, D5, D6, D7, D8, D9, D10, D11, and D12 may calculate the SINR or the throughput based on the decoding matrix.

Also, each of the destination nodes D1, D2, D3, D4, D5, D6, D7, D8, D9, D10, D11, and D12 belonging to the user groups 221, 222, and 223 may feed back the generated quality information, for example, the throughput information, to a corresponding source node.

4. Step 4 of Random Beamforming

Where SINR information or throughput information is feedback to the source nodes (S1, S2, and S3) 211, 212, and 213, each of the source nodes (S1, S2, and S3) 211, 212, and 213 may select at least one destination node to communicate with the corresponding source node from the plurality of destination nodes D1, D2, D3, D4, D5, D6, D7, D8, D9, D10, D11, and D12. Each of the source nodes (S1, S2, and S3) 211, 212, and 213 may select any one destination node corresponding to a maximum SINR or a maximum throughput with respect to the user groups 221, 222, and 223.

For example, the source node (S1) 211 may select the destination node D2 from the user group 221. The source node (S2) 212 may select the destination node D6 from the user group 222. The source node (S3) 213 may select the destination node D9 from the user group 223. In this case, the source node (S1) 211 and the destination node D2 may be constructed as a pair. Also, the source node (S2) 212 and the destination node D6 may be constructed as a pair. The source node (S3) 213 and the destination node D9 may be constructed as a pair.

Specifically, according to one example, when a random beamforming technology is applied, the source nodes (S1, S2, and S3) 211, 212, and 213 may achieve the same performance as or a similar performance to a performance of the interference control scheme or the interference alignment technology without requiring information associated with interference channels. In particular, as a number of destination nodes included in the user groups 221, 222, and 223 increases, a sum rate of the communication system may increase.

Figure 3:
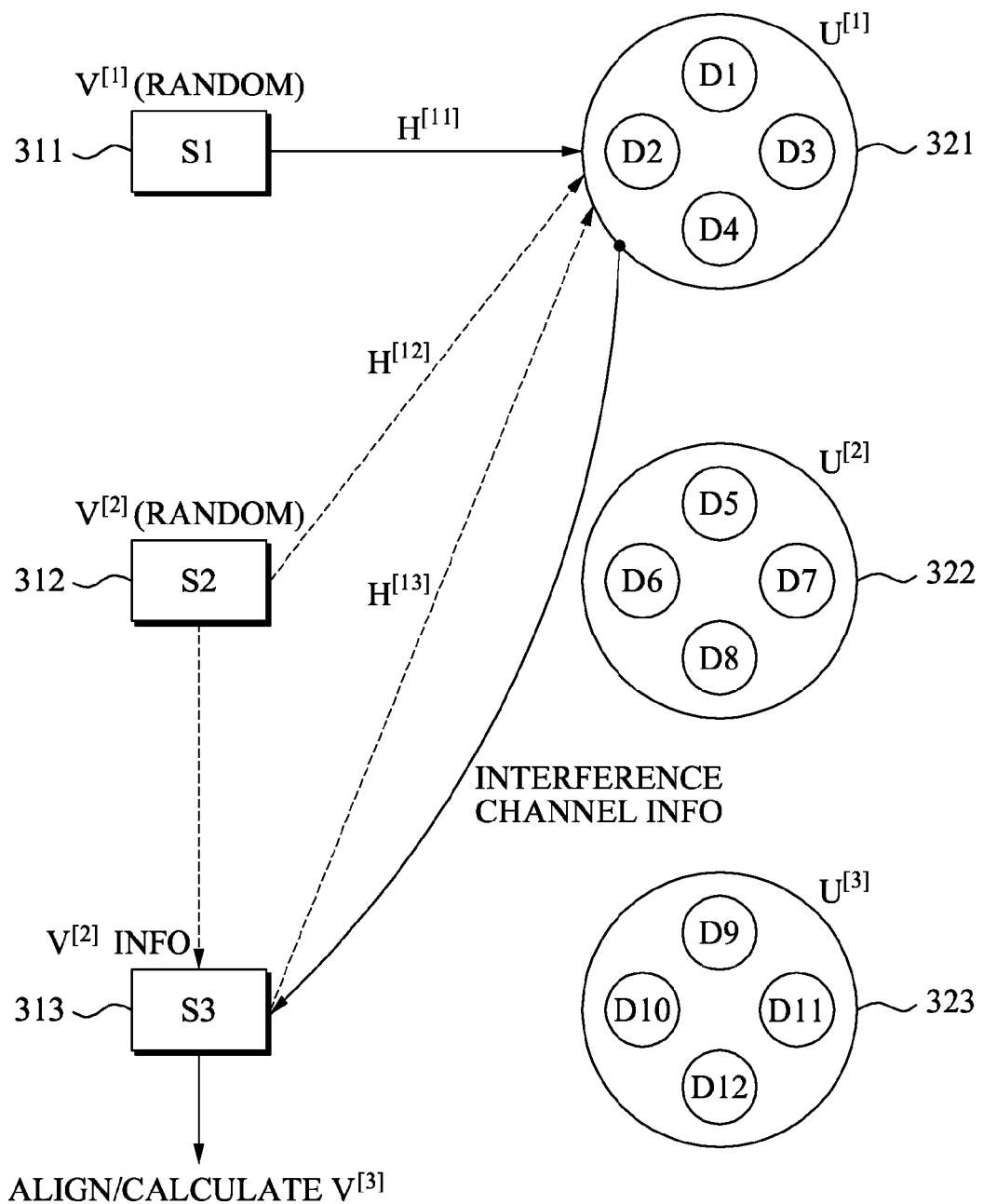
FIG. 3 is a diagram illustrating relative size and depiction of these a process of feeding back information associated with interference channels and generating a precoding matrix to more accurately perform an interference alignment.

Combination of Random Beamforming Technology and Accurate Interference Alignment Technology 1. Partial Realization of Accurate Interference Alignment Technology FIG. 3 illustrates an exemplary process of feeding back information associated with interference channels and generating a precoding matrix to more accurately perform an interference alignment. Referring to FIG. 3, a user group 321 may feed back information associated with interference channels in order to perform an accurate interference alignment. Although a plurality of user groups 321, 322, and 323 exists, each of the user groups 321, 322, and 323 may require a different throughput. Here, it is assumed that the user group 321 requires a highest throughput.

(1) User Selection

According to one example, when a throughput required by the user group 321 is highest, it is possible to select any one of a plurality of terminals, for example, destination nodes D1, D2, D3, and D4, belonging to the user group 321. The user section may be performed based on the states of the channels formed between a base station that is a source node (S1) 311 (hereinafter, the base station 311) and the plurality of terminals.

For example, each of the terminals belonging to the user group 321 may calculate a signal-to-noise ratio (SNR) or an SINR. Each of the terminals may calculate an achievable throughput $\Sigma \log_2(1+\text{SNR})$ or $\Sigma \log_2(1+\text{SINR})$ based on the SNR or the SINR, and may feed back the calculated achievable throughput to the base station 311. The base station 311 may select a terminal corresponding to a maximum achievable throughput to construct a transmit-receive pair. More specifically, for example, each of the terminals may transmit $\Sigma \log_2(1+\text{SNR})$ to the base station 311 based on zero-forcing.

The base station 311 may select at least one terminal from the plurality of terminals belonging to the user group 321 based on information associated with the achievable throughput that is fed back by the plurality of terminals. In particular, a terminal corresponding to a maximum achievable throughput may be selected. Hereinafter, it is assumed that the terminal, for example, the destination node D2 (hereinafter, the terminal D2) is selected.

(2) Generation of Precoding Matrix for Accurate Interference Alignment.

The terminal D2 selected from the user group 321 may estimate interference channels $H^{[12]}$ and $H^{[13]}$. The selected terminal D2 may feed back information associated with the interference channels $H^{[12]}$ and $H^{[13]}$ to at least one of the source nodes (S2, S3) 312 and 313 corresponding to the neighboring base stations of a serving base station that is the source node (S1) 311. Here, it is assumed that information associated with the interference channels $H^{[12]}$ and $H^{[13]}$ is fed back to the neighboring base station 313.

The neighboring base station 313 may generate a precoding matrix based on information associated with the interference channels $H^{[12]}$ and $H^{[13]}$ of the terminal D2. In particular, the neighboring base station 313 may reasonably generate the precoding matrix so that interference may be accurately aligned in the terminal D2. For example, where a precoding matrix $V^{[2]}$ is used by the neighboring base station 312 and a precoding matrix $V^{[3]}$ is predicted to be used by the neighboring base station 313, interference $V^{[2]}H^{[12]}$ and $V^{[3]}H^{[13]}$ may be received by the terminal D2. In this instance, the neighboring base station 313 may generate the precoding matrix $V^{[3]}$ for an interference alignment of the terminal D2 according to the following Equation 4 expressed as:

$$H^{[12]}V^{[2]}=H^{[13]}V^{[3]} \rightarrow V^{[3]}=(H^{[13]})^{-1}H^{[12]}V^{[2]} \quad (4).$$

(3) Use of Random Beamforming Technology

Through the above operations of User Selection and Generation of precoding matrix for accurate interference alignment, the terminal D2 corresponding to an optimal terminal may be selected from the user group 321, and the precoding matrix $V^{[3]}$ for the accurate interference alignment of the terminal D2 may be generated. Since the interference alignment may be more accurately performed by the terminal D2, a required throughput may be achieved.

According to one example, a transmit-receive pair may be constructed with relatively little overhead by applying a random beamforming technology to user groups 322 and 323 corresponding to neighboring user groups of the user group 321. Description related thereto is made with reference to FIG. 4 below.

2. Partial Random Beamforming Technology

Figure 4:
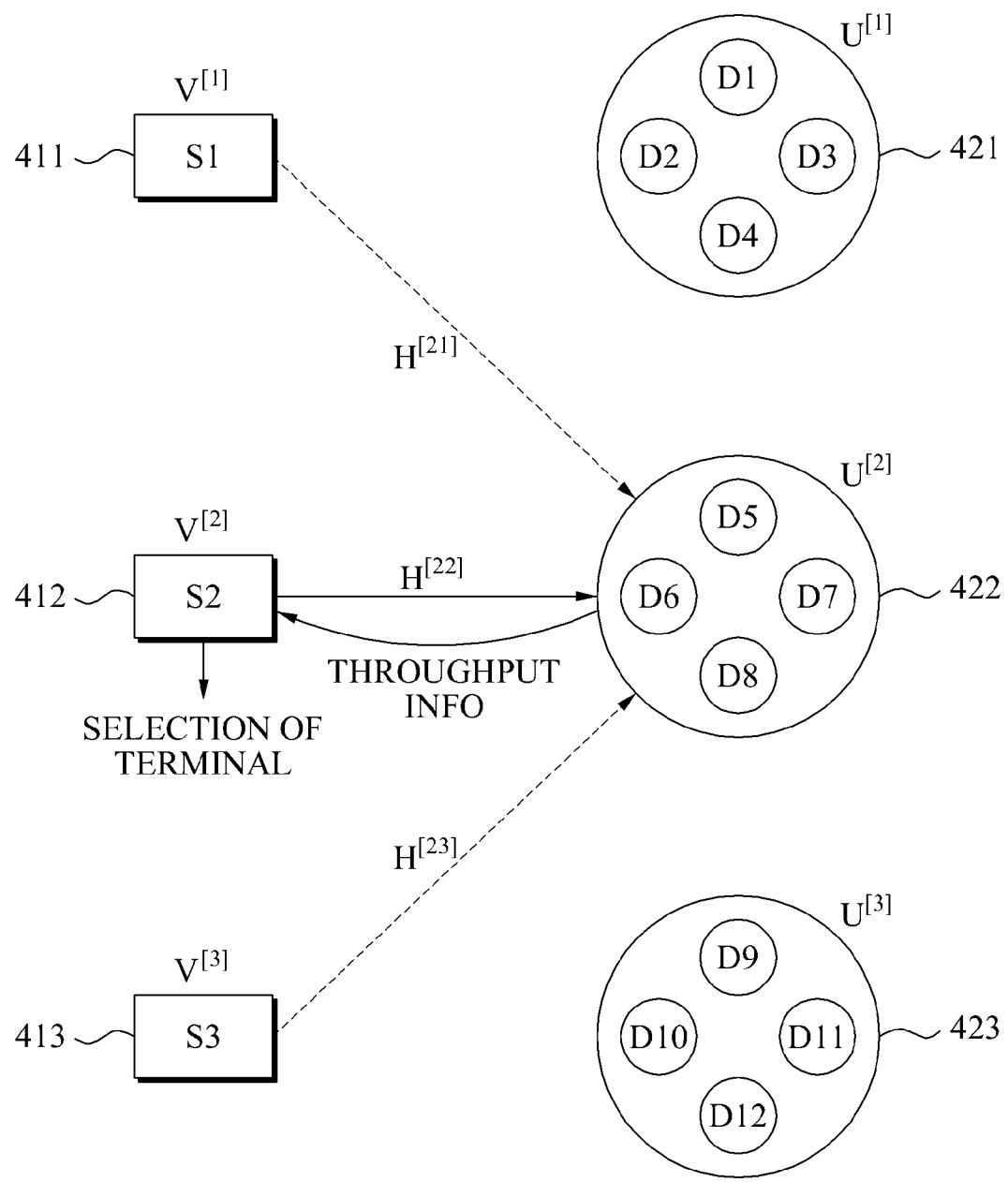
FIG. 4 is a diagram illustrating an exemplary process of feeding back information associated with a throughput and selecting a terminal to decrease overhead.

FIG. 4 illustrates an exemplary process of feeding back information associated with a throughput and selecting a terminal to decrease overhead. Referring to FIG. 4, a random beamforming technology may be applied to only a portion of user groups 421, 422, and 423. Here, it is assumed that the user group 421 corresponds to a serving user group, and the user groups 422 and 423 correspond to neighboring user groups. Specifically, in order to generate a precoding matrix $V^{[2]}$, a neighboring base station 412 may not use information associated with precoding matrices $V^{[1]}$ and $V^{[3]}$ used by other base stations, for example, a serving base station 411 and another neighboring base station 413, and information associated with interference channels. Accordingly, the neighboring base station 412 may perform a reasonable interference alignment with relatively little overhead.

The neighboring base station 412 and the neighboring user group 422 may operate according to the aforementioned random beamforming technology. Each of the terminals belonging to the neighboring user group 422 may estimate interference channels. Each of the terminals belonging to the neighboring user group 422 may generate a decoding matrix according to a predetermined decoding scheme.

Each of the terminals belonging to the neighboring user group 422 may calculate a throughput using the decoding matrix, and may feed back information associated with the calculated throughput to the neighboring base station 412. The neighboring base station 412 may select at least one terminal from the terminals belonging to the neighboring user group 422, based on the fed back throughput information, to thereby construct one or more transmit-receive pairs.

Since the neighboring base station 412 uses a random precoding matrix $V^{[2]}$, the neighboring base station 412 does not generate a new precoding matrix for an interference alignment. Specifically, since the neighboring base station 412 does not require information associated with interference channels and information associated with precoding matrices $V^{[1]}$ and $V^{[3]}$ used by other base stations, for example, the serving base station 411 and the other neighboring base station 413, it is possible to decrease or minimize overhead.

Where a transmit-receive pair is constructed between the neighboring base station 412 and the neighboring user group 422, the neighboring base station 413 and the neighboring user group 423 also may construct a transmit-receive pair using the random beamforming technology.

According to one example, the user group 421 requiring an enhancement of throughput may feed back information associated with interference channels for an accurate interference alignment. The neighboring base station 413 may dynamically generate a precoding matrix so that interference is well aligned in the user group 421. On the other hand, the remaining user groups 422 and 423 do not feed back interference channel information and the neighboring base station 412 uses a random precoding matrix. Through this configuration, overhead may be decreased. Specifically, according to one example, an optimal solution may be provided with respect to a tradeoff relationship between the overhead and the throughput by reasonably combining a random beamforming technology and an accurate interference alignment technology.

Figure 5:
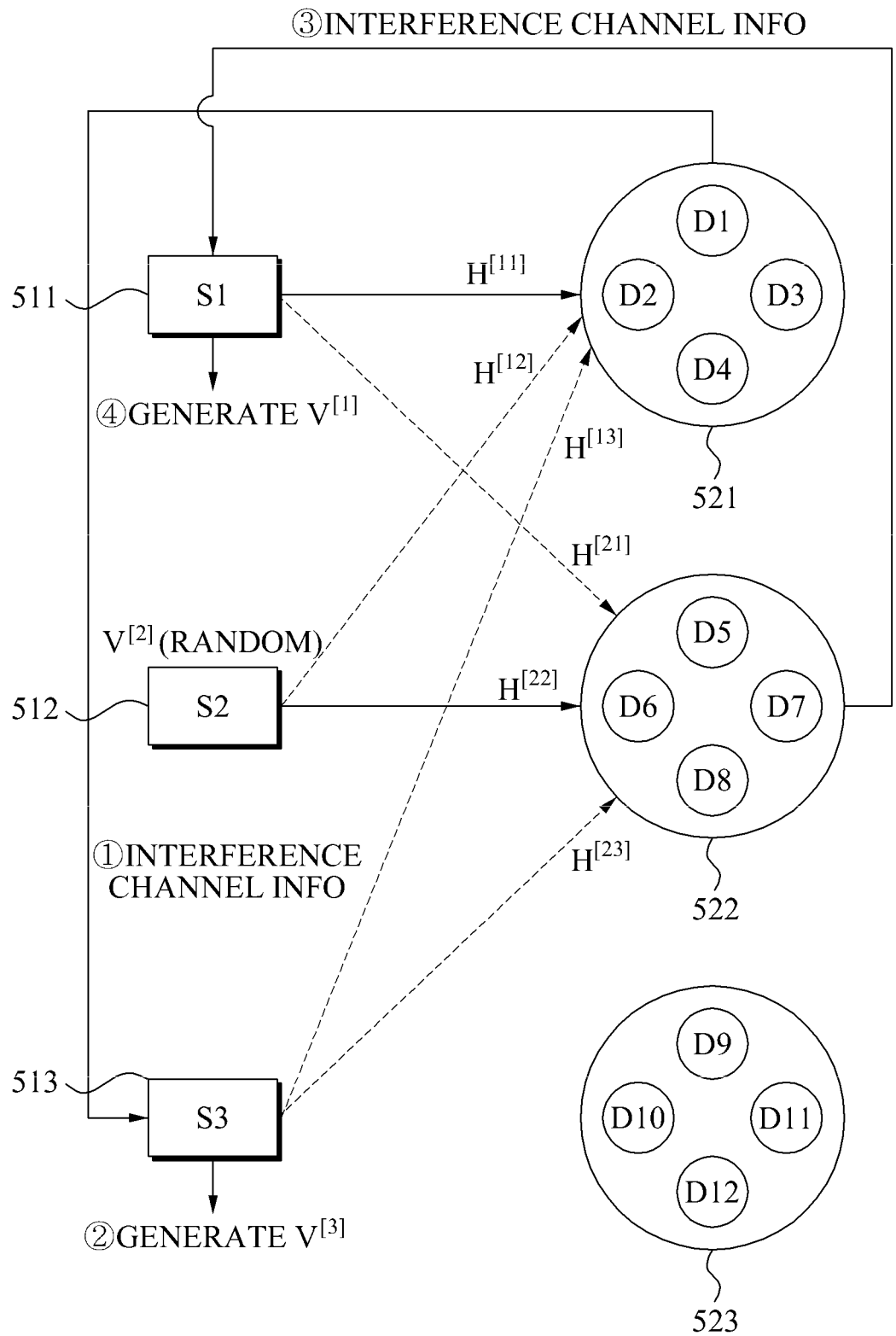
FIG. 5 is a diagram illustrating an example of feeding back, by two user groups, information associated with interference channels, and feeding back, by the remaining user group, information associated with a throughput.

3. Extended Combination of Random Beamforming Technology and Accurate Interference Alignment Technology FIG. 5 illustrates an example of feeding back information associated with interference channels by two user groups, and feeding back information associated with a throughput by the remaining user group. Referring to FIG. 5, in order to enhance a throughput even with respect to a neighboring user group 522, a terminal selected from the neighboring user group 522 may feed back information associated with interference channels. In this instance, a serving base station 511 may generate a precoding matrix $V^{[1]}$ for an accurate interference alignment based on information associated with the interference channels of the selected terminal.

Hereinafter, it is assumed that a terminal D2 is selected from a user group 521 and a terminal D6 is selected from the neighboring user group 522. In this case, in order to enhance a throughput with respect to the terminal D2, a neighboring base station 513 may need to generate a precoding matrix $V^{[3]}$ for the accurate interference alignment. Also, in order to enhance a throughput with respect to the terminal D6, the serving base station 511 also may need to generate the precoding matrix $V^{[1]}$ for the accurate interference alignment.

The terminal D2 may feed back information associated with interference channels $H^{[12]}$ and $H^{[13]}$ to the neighboring base station 513. Here, it is assumed that the serving base station 511 and the neighboring base station 512 use random precoding matrices. The neighboring base station 513 may generate the precoding matrix $V^{[3]}$ for the accurate interference alignment based on information associated with the interference channels $H^{[12]}$ and $H^{[13]}$.

After the precoding matrix $V^{[3]}$ for the accurate interference alignment is generated, the terminal D6 may feed back information associated with interference channels $H^{[21]}$ and $H^{[23]}$ to the serving base station 511. In this instance, the serving base station 511 may change the random precoding matrix to the new precoding matrix $V^{[1]}$ for the accurate interference alignment.

Since the precoding matrices $V^{[1]}$ and $V^{[3]}$ are generated and used for the accurate interference alignment of the terminals D2 and D6, the throughput of the terminals D2 and D6 may be enhanced. Some overhead may occur while feeding back information associated with interference channels for the accurate interference alignment of the terminals D2 and D6 and while sharing information associated with precoding matrices used by other base stations. However, according to this example, an accurate interference alignment may be performed with respect to a user group requiring an enhancement of throughput. The random beamforming technology may be applied with respect to a user group not requiring the enhancement of the throughput in order to decrease overhead. Accordingly, various types of requirements may be satisfied.

4. Various Types of Scenarios to Combine Random Beamforming Technology and Accurate Interference Alignment Technology FIGS. 6A, 6B, and 6C illustrate a frame structure corresponding to various examples of assigning a priority to a user group.

Figure 6A:
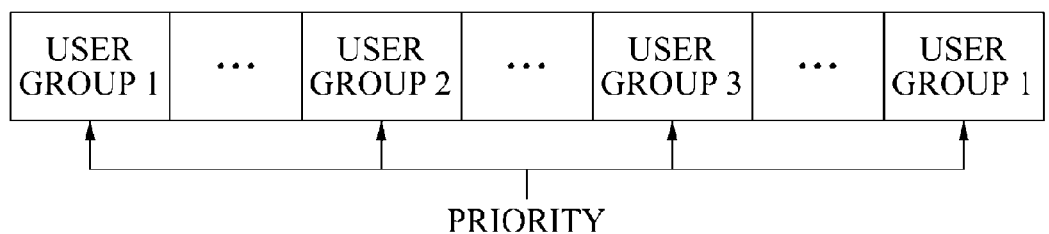
FIGS. 6A, 6B, and 6C are diagrams illustrating a frame structure corresponding to various examples of assigning a priority to a user group.

FIG. 6A illustrates an exemplary frame structure 610 where a priority is fairly assigned to all the user groups (user group 1, user group 2, user group3). FIG. 6B illustrates an exemplary frame structure 620 where a priority is further assigned to a particular user group, for example, a user group 1. FIG. 6C illustrates an exemplary frame structure 630 where a new additional user, for example, a user group 4, is added.

Referring to FIG. 6A, priority is fairly assigned to all the user groups (user group 1, user group 2, user group3). A user group with priority may operate according to a protocol for an accurate interference alignment. Specifically, a terminal selected from the user group with priority may feed back information associated with interference channels for the accurate interference alignment, and a corresponding base station may generate a precoding matrix for the accurate interference alignment based on information associated with the interference channels. In the frame structure 610, all the user groups (user group 1, user group 2, user group3) have a fair opportunity for the accurate interference alignment.

Figure 6B:
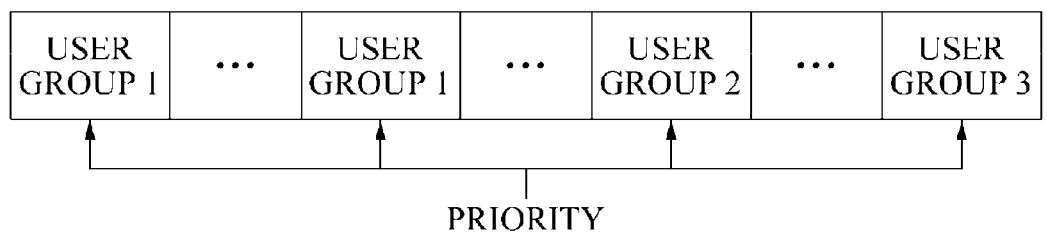
Figure 6C:
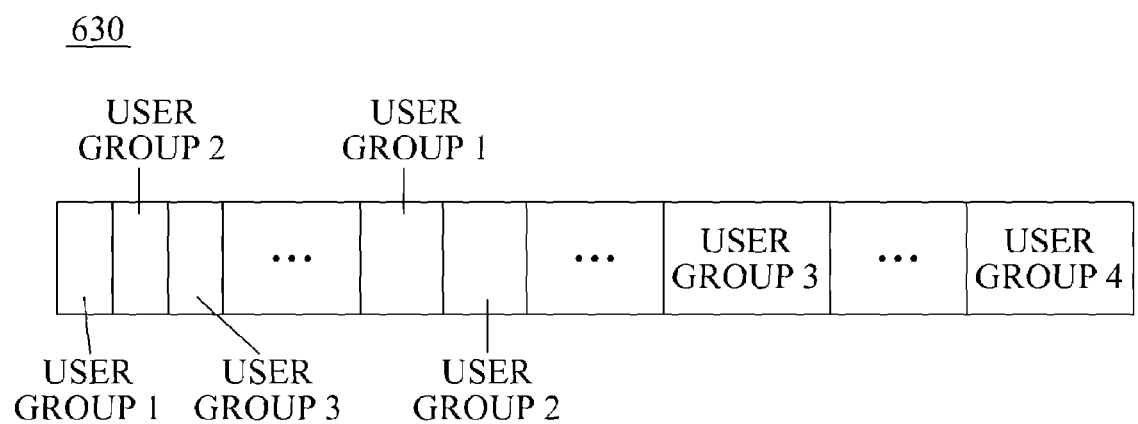

Referring to FIG. 6B, priority is further assigned to the user group 1. It may occur in many cases, for example, a case where a terminal selected from the user group 1, requires increased throughput. The terminal selected from the user group 1 may further perform the accurate interference alignment to enhance throughput.

Referring to FIG. 6C, priority may be assigned in various types of forms. A time when priority is assigned to each of the user groups (user group 1, user group 2, user group3), a number of times that priority is assigned to each of the user groups (user group 1, user group 2, user group3), and the like may be variously adjusted. In particular, where the new user group, for example, the user group 4 is added, priority may be additionally assigned to the user group 4.

Figure 7:
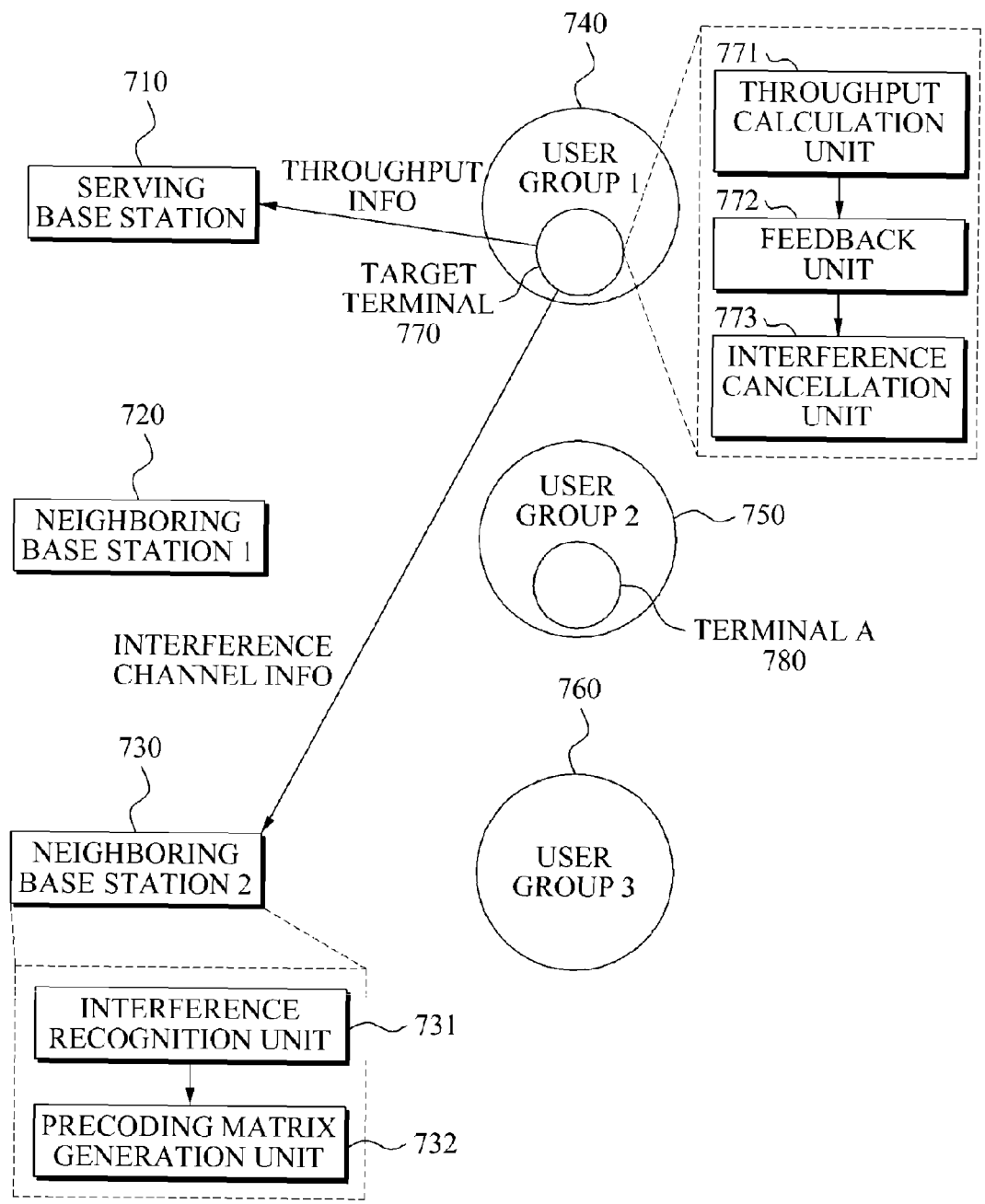
FIG. 7 is a diagram illustrating an example of an internal configuration of a neighboring base station and a target terminal.

FIG. 7 illustrates an example of an internal configuration of a neighboring base station (2) 730 and a target terminal 770.

Referring to FIG. 7, a serving base station 710 may correspond to a user group (1) 740. A neighboring base station (1) 720 may correspond to a user group (2) 750, and the neighboring base station (2) 730 may correspond to a user group (3) 760.

The target terminal 770 may include a throughput calculation unit 771, a feedback unit 772, and an interference cancellation unit 773. The throughput calculation unit 771 may calculate an achievable throughput based on a state of a channel formed between the serving base station 710 and the target terminal 770. The feedback unit 772 may feed back throughput information to the serving base station 710, and the serving base station 710 may select any one terminal from a plurality of terminals based on the fed back throughput information. Here, it is assumed that the target terminal 770 is selected from a plurality of terminals belonging to the user group (1) 740.

The feedback unit 772 may feed back, to the neighboring base station (2) 730, information associated with interference channels from the neighboring base station (1) 720 and the neighboring base station (2) 730 to the target terminal 770. In this instance, the neighboring base station (2) 730 may include an interference recognition unit 731 and a precoding matrix generation unit 732. The interference recognition unit 731 may recognize information associated with the interference channels from the neighboring base station (1) 720 and the neighboring base station (2) 730 to the target terminal 770 that is fed back by the target terminal 770. The precoding matrix generation unit 732 may generate a precoding matrix for the accurate interference alignment based on information associated with the interference channels and information associated with a precoding matrix used by the neighboring base station (1) 720 that is the remaining neighboring base station.

The interference cancellation unit 773 may cancel interference caused by the neighboring base station (1) 720 and the neighboring base station (2) 730. In this instance, since the neighboring base station (2) 730 uses a precoding matrix generated for accurate interference alignment, the interference caused by the neighboring base station (1) 720 and the neighboring base station (2) 730 is well aligned.

After the target terminal 770 is selected, a random beamforming technology may be applied to the user group (2) 750 and the user group (3) 760. For example, where a plurality of terminals is included in the user group (2) 750, a terminal A 780 is determined as a transmit-receive pair of the neighboring base station (1) 720 through the random beamforming technology.

The operations made above with reference to FIGS. 1 through 6 also are applicable to the neighboring base station (2) 730 and the target terminal 770, and thus further detailed description related thereto is not repeated here.

According to the examples described above, a portion of the user groups may feed back information associated with interference channels in order to enhance throughput, whereas the remaining user group may feed back throughput information in order to decrease or minimize overhead. Through these examples, technology optimization may be provides that enhances throughput and decreases overhead with respect to the tradeoff relationship between throughput and the overhead identified above.

The methods described above may be recorded, stored, or fixed in one or more computer-readable media that includes program instructions to be implemented by a computer to cause a processor to execute or perform the program instructions. The media also may include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules or units in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station that is any one of at least two neighboring base stations adjacent to a serving base station having a corresponding user group including a plurality of terminals and a target terminal, the base station comprising:
    an interference recognition unit configured to recognize information associated with interference channels between the at least two neighboring base stations and the target terminal that is fed back from the target terminal directly to the one of at least two neighboring base stations; and
    a precoding matrix generation unit configured to generate a target precoding matrix based on the information associated with the interference channels and information associated with a precoding matrix used by another of the at least two neighboring base stations,
    wherein the precoding matrix generation unit is configured to dynamically generate the precoding matrix upon receiving feed back information from the user group requiring an enhancement of throughput.

2. The base station of claim 1, wherein the at least two neighboring base stations having corresponding neighboring user groups, and a plurality of terminals belonging to the corresponding neighboring user groups are configured to generate decoding matrices based on corresponding interference channels, and feed back, to at least one neighboring base station of the at least two neighboring base stations, information associated with a throughput that is calculated based on the decoding matrices.

3. The base station of claim 2, wherein each of the at least two neighboring base stations is configured to select at least one terminal from the plurality of terminals belonging to the neighboring user groups, based on the fed back information associated with the throughput.

4. The base station of claim 1, wherein:
    each of the terminals is configured to feed back an available throughput of the serving base station to the serving base station, and
    the serving base station is configured to select the target terminal based on the achievable throughput.

5. The base station of claim 1, wherein the serving base station and the another one of the at least two neighboring base stations are configured to use random precoding matrices.

6. The base station of claim 1, wherein the precoding matrix generation unit is configured to generate the target precoding matrix to align interferences in the target terminal.

7. The base station of claim 1, wherein the precoding matrix generation unit is configured to independently generate the target precoding matrix with respect to a precoding matrix used by the serving base station.

8. The base station of claim 1, wherein the precoding matrix generation unit is configured to generate the precoding matrices using an iterative scheme.

9. A target terminal that belongs to a user group corresponding to a serving base station, the target terminal comprising:
a feedback unit configured to feed back information associated with interference channels between at least two neighboring base stations adjacent to the serving base station and the target terminal; and
an interference cancellation unit configured to cancel aligned interference that is received from the at least two neighboring base stations,
wherein any one neighboring base station of the at least two neighboring base stations is configured to use, for an interference alignment, a target precoding matrix that is dynamically generated based on information associated with the interference channels that is fed back directly by the target terminal requiring an enhancement of throughput, and the serving base station and another one of the at least two neighboring base stations are configured to use random precoding matrices.

10. The target terminal of claim 9, further comprising:
a throughput calculation unit configured to calculate an achievable throughput of the serving base station based on a state of a channel formed between the serving base station and the target terminal,
wherein the feedback unit is configured to feed back, to the serving base station, information associated with the achievable throughput.

11. The target terminal of claim 10, wherein the base station is configured to select a target terminal based on information associated with the available throughput that is fed back from a plurality of terminals belonging to the user group.

12. A method of operating any one terminal among a plurality of terminals belonging to a neighboring user group corresponding to any one neighboring base station of at least two neighboring base stations adjacent to a serving base station, the method comprising:
estimating interference channels from the serving base station and another neighboring base station to the one terminal;
generating a decoding matrix for extracting a desired signal that is transmitted from the one neighboring base station, based on the estimated interference channels; and
feeding back, to the one neighboring base station, information associated with a throughput of the desired signal that is calculated based on the generated decoding matrix and configured to facilitate selection by the one neighboring base station of any one terminal from a plurality of terminals belonging primarily to the one neighboring user group; and
dynamically generating a target precoding matrix based on the information associated with the interference channels and information associated with a precoding matrix used by another of the at least two neighboring base stations upon receiving feed back information from the user group.

13. The method of claim 12, further comprising feeding back by terminals belonging to a user group corresponding to the serving base station, to another of the at least two neighboring base stations, information associated with corresponding interference channels.

14. The method of claim 13, further comprising generating and using by the another of the at least two neighboring base stations a precoding matrix for an interference alignment of at least one terminal of the terminals belonging to the user group, based on information associated with the corresponding interference channels.

15. The method of claim 12, further comprising adjusting a phase of a signal using the precoding matrices.

16. The method of claim 12, further comprising separating at the terminal a received signal into a desired signal and unwanted interference.

17. A method of operating any one base station among at least two neighboring base stations adjacent to a serving base station having a corresponding user group including a plurality of terminals and a target terminal, the method comprising:
recognizing information associated with interference channels between the at least two neighboring base stations and the target terminal that is fed back from the target terminal directly to the one base station among at least two neighboring base stations; and
generating a target precoding matrix based on information associated with the interference channels and information associated with a precoding matrix used by another of the at least two neighboring base stations,
wherein the target precoding matrix is dynamically generated upon receiving feed back information from the user group.

18. A method of operating a target terminal belonging to a user group corresponding to a serving base station having at least two neighboring base stations adjacent to the serving base station wherein any one neighboring base station of the at least two neighboring base stations uses, for an interference alignment, a target precoding matrix that is generated based on information associated with interference channels from the at least two neighboring base stations that is fed back directly by the target terminal, and the serving base station and another of the at least two base stations use random precoding matrices, the method comprising:
feeding back, to the target terminal, the information associated with interference channels from the at least two neighboring base stations;
dynamically generating the target precoding matrix based on the information associated with the interference channels and information associated with a precoding matrix used by another of the at least two neighboring base stations upon receiving feed back information from the user group; and
canceling aligned interference that is received from the at least two neighboring base stations.

19. A non-transitory computer-readable recording medium storing a program configured to operate any one terminal among a plurality of terminals belonging to a neighboring user group corresponding to any one neighboring base station of at least two neighboring base stations adjacent to a serving base station, the stored program including instructions configured to cause a computer to:
estimate interference channels from the serving base station and another neighboring base station to the one terminal;

generate a decoding matrix for extracting a desired signal that is transmitted from the one neighboring base station, based on the estimated interference channels;

feed back, to the one neighboring base station, information associated with a throughput of the desired signal that is calculated based on the generated decoding matrix and configured to facilitate selection by the one neighboring base station of any one terminal from a plurality of terminals belonging primarily to the one neighboring user group; and dynamically generate a target precoding matrix based on the information associated with the interference channels and information associated with a precoding matrix used by another of the at least two neighboring base stations upon receiving feed back information from the user group.

20. A system comprising:
a first base station;
a serving base station having a corresponding user group including a plurality of terminals and a target terminal corresponding to the serving base station;
a second base station adjacent to the serving base station including an interference recognition unit configured to recognize information associated with interference channels between the at least two neighboring base stations and the target terminal that is fed back from the target terminal directly to the second base station, and
a precoding matrix generation unit configured to generate a target precoding matrix based on the information associated with the interference channels and information associated with a precoding matrix used by another of the at least two neighboring base stations,
wherein the target precoding matrix is dynamically generated upon receiving feed back information from the user group.

21. The system of claim 20, wherein, where terminals belonging to a neighboring user group corresponding to any one neighboring base station of the first or second base stations feed back information associated with corresponding interference channels, the serving base station is configured to generate a new precoding matrix for an interference alignment of the terminals belonging to the neighboring user group, based on information associated with the corresponding interference channels that are fed back by the terminals belonging to the neighboring user group.

22. The system of claim 21, wherein:
where a priority is assigned to at least one user group among the user group and neighboring user groups corresponding to the first base station and the second base station, terminals belonging to the at least one user group with the assigned priority are configured to feed back information associated with corresponding interference channels, and
the base station corresponding to the at least one user group with the assigned priority is configured to generate a new precoding matrix for an interference alignment of terminals belonging to the at least one user group with the assigned priority, based on the fed back information associated with the corresponding interference channels.

23. A communications system comprising
a serving base station having a corresponding user group;
at least two neighboring base stations adjacent to the serving base station;
a target terminal that belongs to the user group corresponding to the serving base station, the target terminal including a feedback unit configured to feed back information associated with interference channels between the at least two neighboring base stations and the target terminal; and
an interference cancellation unit configured to cancel aligned interference that is received from the at least two neighboring base stations,
wherein any one neighboring base station of the at least two neighboring base stations is configured to use, for an interference alignment, a target precoding matrix that is generated based on information associated with the interference channels that is fed back directly by the target terminal, and the serving base station and another one of the at least two neighboring base stations are configured to use random precoding matrices,
wherein the target precoding matrix is dynamically generated upon receiving feed back information from the user group requiring an enhancement of throughput.

24. The system of claim 23, wherein:
the at least two neighboring base stations have corresponding neighboring user groups, and
a plurality of terminals belonging to the neighboring user groups are configured to generate decoding matrices based on corresponding interference channels, and feed back, to the at least two neighboring base stations, information associated with a throughput that is calculated based on the decoding matrices.

25. The system of claim 24, wherein each of the at least two neighboring base stations is configured to select at least one terminal from the plurality of terminals belonging to the neighboring user groups, based on the fed back information associated with the throughput.

26. The system of claim 25, wherein each of the at least two neighboring base stations is configured to select at least one terminal from the plurality of terminals belonging to the neighboring user groups, regardless of whether information associated with interference channels of the terminals belonging to the neighboring user groups exists.

27. The terminal of claim 23, wherein:
where a priority is assigned to at least one user group among the user group and neighboring user groups corresponding to the at least two neighboring base stations, terminals belonging to a user group with the assigned priority are configured to feed back information associated with corresponding interference channels, and
a base station corresponding to the user group with the assigned priority is configured to generate a new precoding matrix for an interference alignment of terminals belonging to the user group with the assigned priority, based on the fed back information associated with the corresponding interference channels.

* * * * *